Feb. 20, 1934.  G. J. BARRETT  1,947,512
AUTOMATIC SIGNAL FOR ADDING MACHINES
Filed Sept. 8, 1931  9 Sheets-Sheet 1

Fig. 1

INVENTOR
Glenn J. Barrett
BY Chappell & Earl
ATTORNEYS

Feb. 20, 1934.　　G. J. BARRETT　　1,947,512
AUTOMATIC SIGNAL FOR ADDING MACHINES
Filed Sept. 8, 1931　　9 Sheets-Sheet 2

Fig. 2

INVENTOR
Glenn J. Barrett
BY Chappell & Earl
ATTORNEYS

Fig. 4

Feb. 20, 1934. G. J. BARRETT 1,947,512
AUTOMATIC SIGNAL FOR ADDING MACHINES
Filed Sept. 8, 1931 9 Sheets-Sheet 8

INVENTOR
Glenn J. Barrett
BY Chappell & Earl
ATTORNEYS

Feb. 20, 1934.　　　G. J. BARRETT　　　1,947,512
AUTOMATIC SIGNAL FOR ADDING MACHINES
Filed Sept. 8, 1931　　9 Sheets-Sheet 9

INVENTOR
Glenn J. Barrett
BY
ATTORNEYS

Patented Feb. 20, 1934

1,947,512

UNITED STATES PATENT OFFICE 1,947,512

AUTOMATIC SIGNAL FOR ADDING MACHINES

Glenn J. Barrett, Grand Rapids, Mich., assignor to Portable Adding Machine Company, New York, N. Y.

Application September 8, 1931. Serial No. 561,550

29 Claims. (Cl. 235—60)

This invention relates to improvements in automatic signals for adding machines. These signals are particularly to denote and record the character of the number printed and to denote whether or not the accumulators are at cipher position, previous to the recording of such number.

The object of my invention as a whole is to apply a system of automatic identifying signals to machines of the class of the Corona adding machine, including a signal to indicate a non-added item; a signal to denote a final total, that is, a total followed by a clearing operation; a signal to denote a subtotal in which the said subtotal is returned to the accumulators; and a signal to denote that the accumulators are clear. The latter signal is a duplex one, as it includes a type printable opposite an item, and a visible signal to indicate without printing that the accumulators are clear.

A further object of my invention is to provide means for maintaining my signal to denote that the accumulators are clear both in position where it may be seen, and also where its cooperating type may print adjacent to an item to indicate that the accumulators were previously clear, with means for maintaining said positions during successive operations of the main operating mechanism so long as the accumulators remain at zero position.

A further object is to provide a means for indicating a non-add item if same immediately follows a clearing operation and the clear signal shall have been previously positioned, including means for displacing said clear signal and substituting a non-add signal to print opposite said non-add item while the accumulators remain clear, and also for returning said clear signal to printing position during said non-add operation after the printing of said non-add item and character.

A further object is to simplify all structures by placing all printable signals except a portion of said total signal upon the same carrier, differentially locating same upon said carrier and arranging same with cooperating parts to the end that combinations of mechanical actions will position the correct signal for identification.

Further objects will appear in the specifications covering details and economy of construction, utility and of operation.

A structure embodying the principles of my invention is described in the following specification and is clearly illustrated in the accompanying drawings, in which.

My invention includes automatic identifying signals applied to machines of the class described printable as follows:

Non-add item followed by a dash,
    1.23C
    12.34
    123.45— (non-add-item)
    .12
    13.69*

Subtotal indicated by an "S",
    1.23C
    12.34
    13.57S (subtotal)
    1.23
    14.80*

A final total indicated by *, (see 14.80* above)

Successive adding movements of the main operating mechanism when accumulators are all at zero,
    .00C
    .00C
    .00C (The "C" indicating that accumulators are all at zero)

Clear signal opposite first added item,
    12.34C
    123.45
    135.79*

First items are non-add items showing return of clear signal opposite first added item following,
    .00C
    .00C
    12.34— (non-add item)
    123.45— (non-add item)
    1234.56— (non-add item)
    12.34C (return of the "C")
    2.34
    14.68* (final total)

My invention is applied to adding machines of the class of the well known Corona adding machine which I have chosen to illustrate in connection with the details of my invention. In machines of this class well known in the adding machine art will be found the following mechanical elements with which my invention cooperates directly or indirectly:

Numeral printable types arranged in denominate columns, selectively positionable for printing added items, non-add items, sub-total, and final totals.

Rotatable accumulators mounted in an oscillating accumulator frame, and oscillating or reciprocating actuators therefor with which said accumulators are maintained in non-active relation during a positioning of said actuators for adding, and in active accumulative relation when said actuators are returned to normal position during a normal adding operation.

A main operating mechanism actuated by a handle for performing the various operations incidental to adding or accumulating and recording items, recording items and not accumulating same, recording a subtotal number, and recording a final total at which latter operation the said accumulators are left at zero or clear position.

A subtotal key and connections, the depression of which positions parts so that an operation of the main operating mechanism records the total upon the accumulators up to that point and returns said sum back into the accumulators.

A final total key and connections, the depression of which positions parts so that a subsequent operation of the main operating mechanism records the total upon said accumulators and leaves them at zero position.

A settable non-add mechanism or mechanism to prevent an accumulative movement of said accumulators, settable by the depression of the final total key, and also by manual manipulation when it is desired to print an item and not accumulate it. Said settable non-add mechanism either positions parts so that the main operating mechanism moves the accumulators out of mesh or active relation to their respective actuators before any accumulative movement of said accumulators could occur, as when taking a final total operation, or maintains said accumulators out of active relation to said actuators after printing an item and during the normal accumulative movement of said actuators.

In machines of the class described are included mechanisms connected to the main operating mechanism for maintaining the accumulators out of mesh or active relation to their actuators during a forward movement of said main operating mechanism while said actuators are taking accumulative positions and for returning said accumulators to active relation to their actuators before returning the latter to normal position, which action is termed a normal adding operation.

In the Corona adding machine and machines of its class, type are positioned for a total by a backward rotation of the accumulators to a stop which brings them back to the zero position. The actuating members to which type carriers are attached being in mesh with the accumulators during this operation, type are presented to printing position to correspond with the backward rotation of the respective accumulators. During a subtotaling operation on machines of the class of the Corona, the accumulators are allowed to remain in mesh during the complete cycle of movement of the main operating mechanism, in which case the accumulators are returned to the exact position in which they formerly were. In a total and clearing operation, or a final total operation as it is called, the action is identical so far as positioning the characters to represent the total is concerned, but in addition a non-add operation is brought into play after printing said total, which forces the accumulators out of mesh, leaving them at the zero position to which they were backwardly rotated in obtaining the total.

In the Corona adding machine a non-add operation is obtained by positioning certain members so that during a return or adding movement of the main operating mechanism, the accumulators are forced out of mesh and held in this position during a normal adding movement. This admits of printing the item set up in the keyboard of the machine but prevents its accumulation into the accumulators. In the Corona adding machine the non-add mechanism does not interfere in any manner with the regular operation of the accumulators up to the point of throwing them out of mesh. Upon the return of the main operating mechanism, they go into mesh under the operation of the automatic mechanism actuated by the main operating mechanism, but are immediately forced out of mesh again after setting the non-add mechanism, as will be more particularly explained hereinafter.

In the Corona adding machine, parts of which I have illustrated in showing the adaptation of my invention, this non-add mechanism is utilized in performing a final totaling operation in which the total is printed and the accumulators left at the zero position.

My non-add signal is positioned by the depression of the non-add key mechanism as disclosed in the accompanying illustrations. My subtotal signal is positioned by the depression of the subtotal key. My final total signal is a compound signal composed of the regular non-add signal which is positioned by the operation of the non-add mechanism in conjunction with the operation of the final totaling mechanism, and another distinctive character which I have chosen to be a star, which normally takes a position immediately on top of said non-add signal, thus: *, and remains there while the accumulators are in mesh with their actuators, which is the case during the printing of a total, as explained.

During a non-add operation this signal is lifted out of printing position because the accumulators are forced out of mesh at the early portion of the operation of the main operating mechanism as in regular addition, there being a link connection from said accumulator oscillating frame and the support for said star signal. The non-add signal acts as a stop for limiting the downward movement of the star signal, and the position of the accumulators, whether in or out of mesh, governs the positioning of said star in printing position.

The clear signal is positioned after the printing of the final compound total signal, during the operation of non-add mechanism, to leave the accumulators at zero position. Details of each of these operations will be described in connection with the positioning of my various signals.

I will now point out some of the details of construction in the Corona adding machine, and the parts will be identified by numerals of reference, which are the same in all the views.

Figure 1:
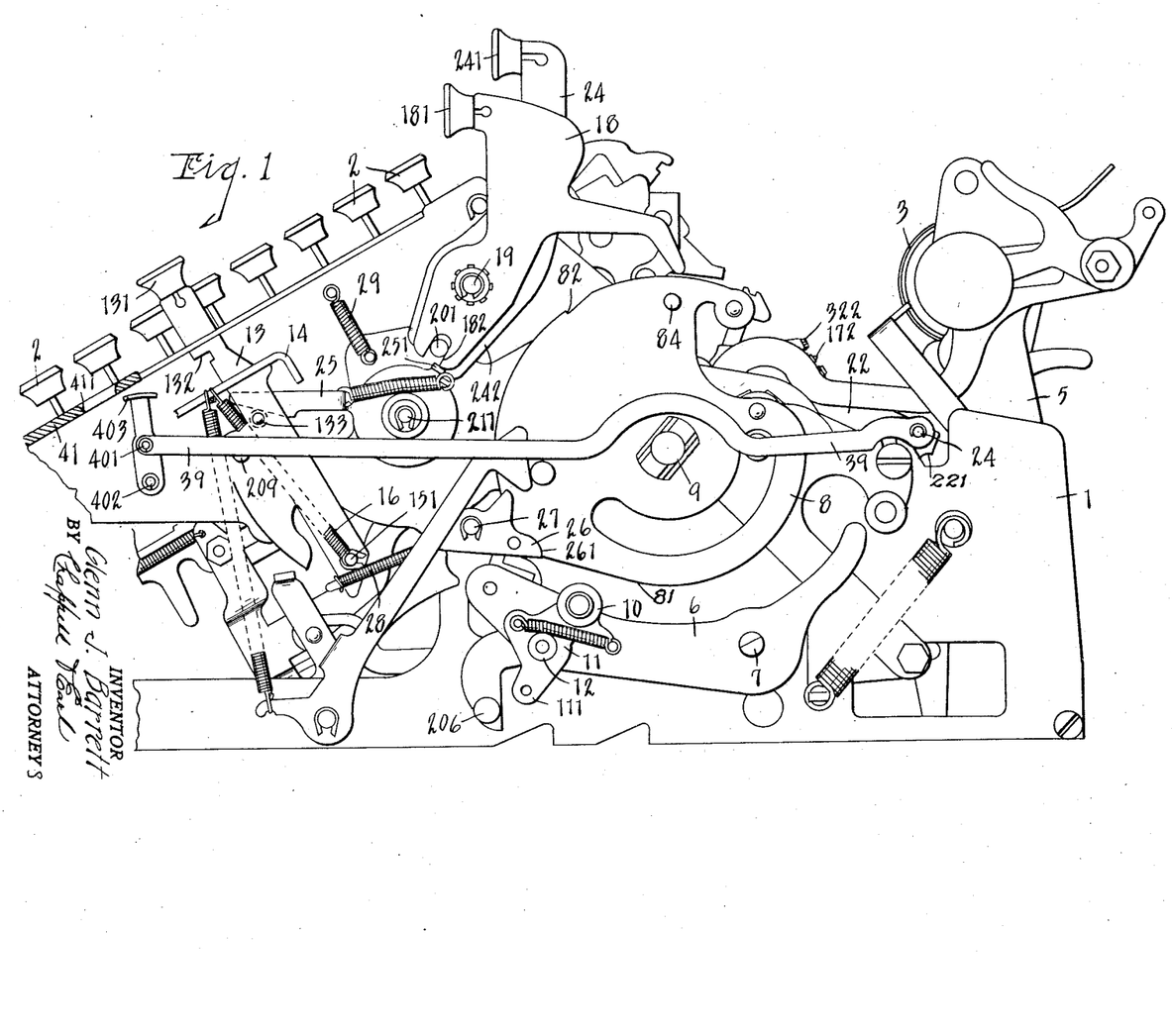
Fig. 1 is a right side fragmentary elevation view of my invention applied to a Corona adding machine, showing certain controlling parts of the machine which cooperate directly or indirectly with my invention, the case and operating lever being omitted.
Figures 11, 12, 13:
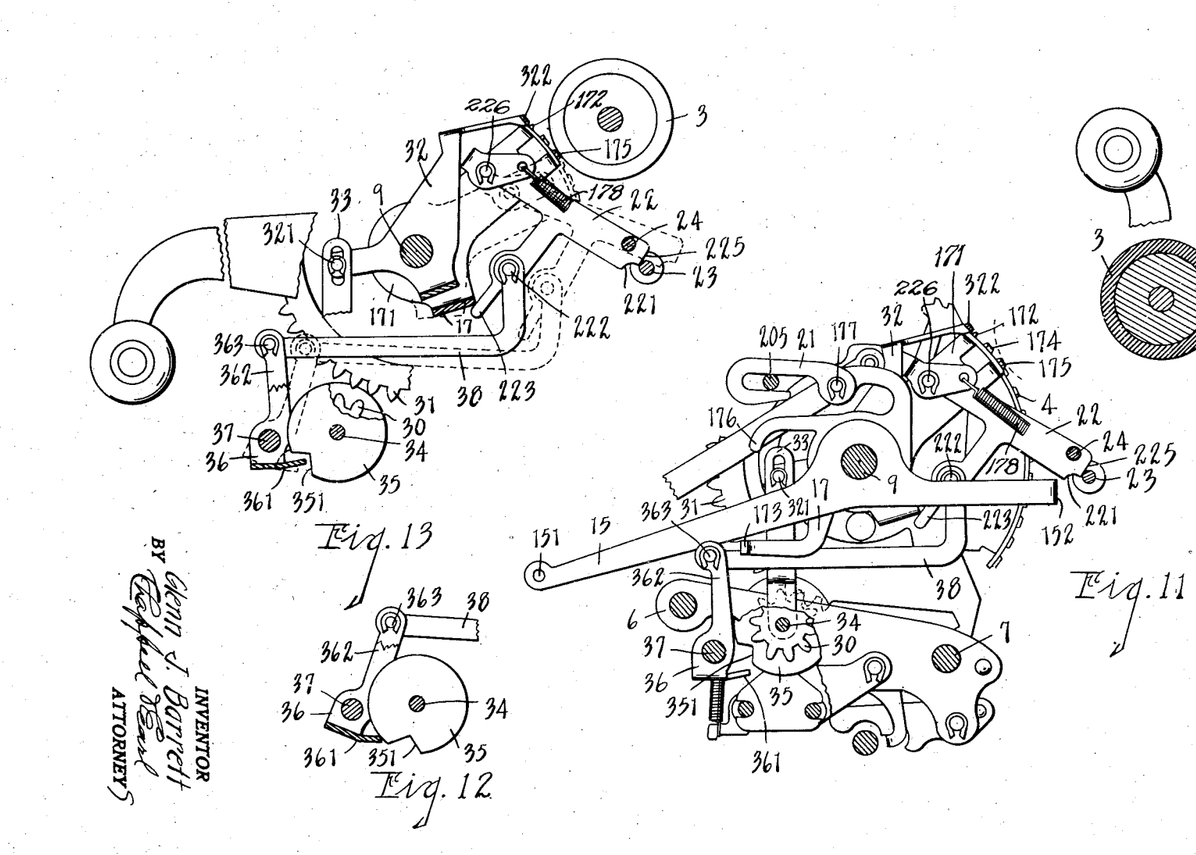
Fig. 11 is a fragmentary sectional elevation taken on line 11—11 of Fig. 5, showing the parts of my invention cooperating immediately with the signal yoke, the latter being positioned as in Fig. 3 to expose the clear signal for printing, and showing more particularly the position of the accumulators of the Corona adding machine when in the zero position and their relation to the tripping off mechanism for resetting the clear signal and printing means when any of the accumulators are not at zero position.
Fig. 12 is a detail fragmentary sectional view of the tripping means shown in Fig. 11 together with one of the accumulators of the Corona adding machine, said accumulator not being in zero position. This view shows the accumulator after it has left mesh with its cooperating actuating sector, forced down into an inoperative position, and shows the periphery of its disk abutting the trip of my invention, forcing same to unlatch the signal yoke so that same may return to normal position, as hereinafter explained.
Fig. 13 is a fragmentary detail sectional view of my signal yoke and the means for latching in position, the heavy lines indicating the position when offering the clear signal for printing, and the dotted lines indicating the normal position when tripped off by action of the accumulators of the Corona adding machine when leaving mesh with some of the said accumulators not in zero position, the dotted lines of said trip being about in the position shown by the corresponding heavy lines in Fig. 10.

Referring to Fig. 1, 1 is the right hand side plate of said adding machine upon which are mounted several controlling members for governing the movements of said adding machine. 2 are the keys for determining the amounts to be added. 3 is the platen which in the Corona is adapted to swing forwardly and impinge against type 4 previously positioned as shown in Fig. 11. 5 is the right side plate of the swinging platen frame in which said platen is rotatably mounted. 6 is the end piece of an oscillating accumulator frame which contains the rotatable accumulators. 7 is the pivotal point for said oscillating accumulator frame which carries the accumulators of said adding machine, by the oscillation of which the accumulators are moved into or out of mesh with suitable actuators.

Figures 7, 8, 9:
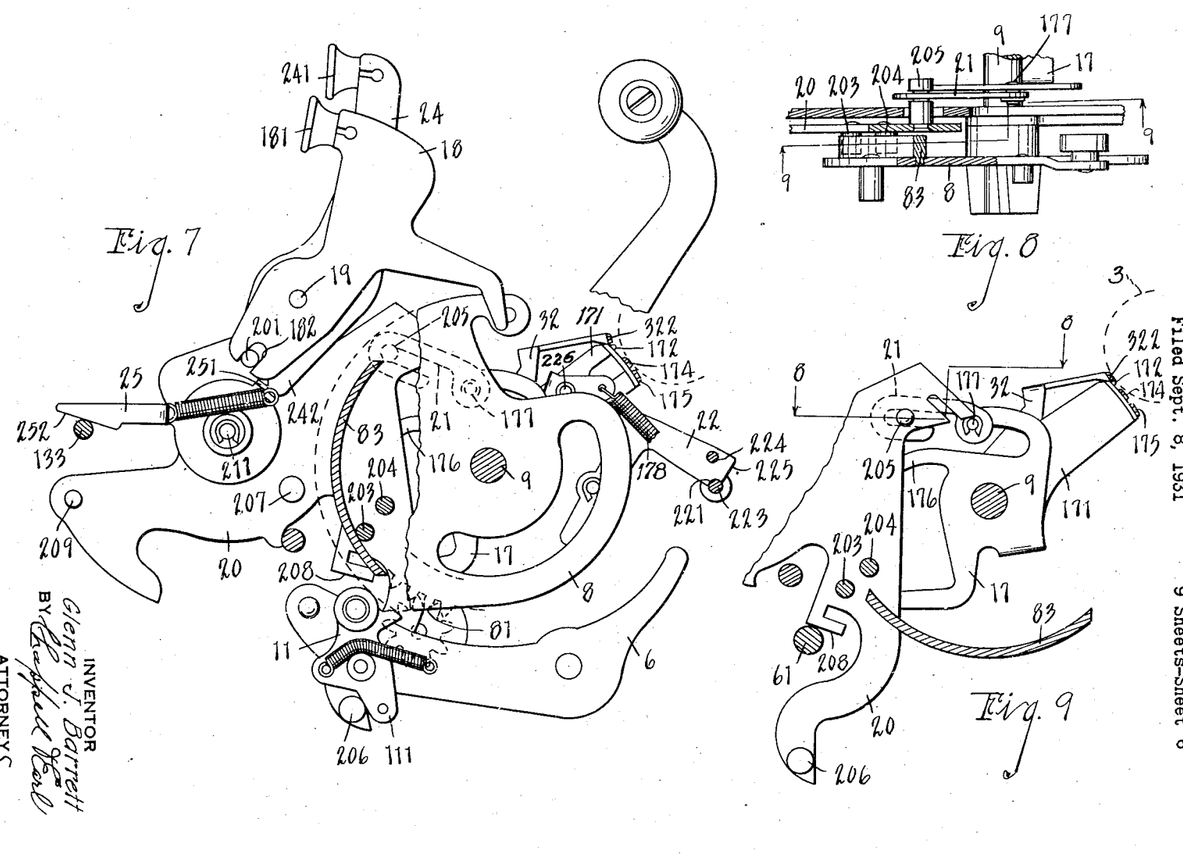
Fig. 7 is an elevation view of certain of the parts shown in Fig. 1, some of which are broken away to expose certain portions of my invention, said parts being in the position for printing a subtotal, showing the proper position for the subtotal signal under the above conditions, a part of the handle being broken away and certain parts in vertical section.
Fig. 8 is a right side sectional elevation view taken on line 8—8 of Fig. 9 showing the yoke bearing of the non-add, subtotal and clear signals, and a secondary arm carrying a star type which, when used in conjunction with the non-add signal, constitutes the total signal, the parts being shown in position for printing the total signal. This view also discloses the connection to the signal yoke which actuates same to the subtotal position, as hereinafter described.
Fig. 9 is a fragmentary detail horizontal sectional view taken on line 9—9 of Fig. 8, showing a portion of my invention and connections for actuating the same, together with certain cooperating parts of the Corona adding machine, a portion of said parts being shown in section for better identification.

8 is an oscillating plate attached to the main shaft 9 which is actuated by the main operating crank mechanism of the adding machine. 81 is a cam face of said plate 8 which normally contacts with the roller 10 carried upon the arm 11 pivoted at 12 upon the side of the frame 6. The normal early movement of said plate 8, by reason of the contact between said cam 81 and the roller 10, forces the accumulators of the adding machine out of mesh with the actuating members therefor. Further movement of said main operating mechanism places the actuators in adding position and also the type which represent the number to be added. The roller 10 travels along upon the curved periphery of the plate 8. When the main operating mechanism reaches the limit of its forward travel, the roller is engaged by the slight notch 82 (Fig. 1) and the early return of the main operating mechanism forces said roller 10 over toward the front of the machine approximately into the same position as shown in Fig. 7, and the accumulators carried in the frame 8 then drop back into mesh with the actuators before the latter start upon their adding movement. It will be understood that during the forward movement of the main operating mechanism, the platen frame 5 is drawn forwardly until the platen impinges against the type at the very end of said forward movement.

Figure 3:
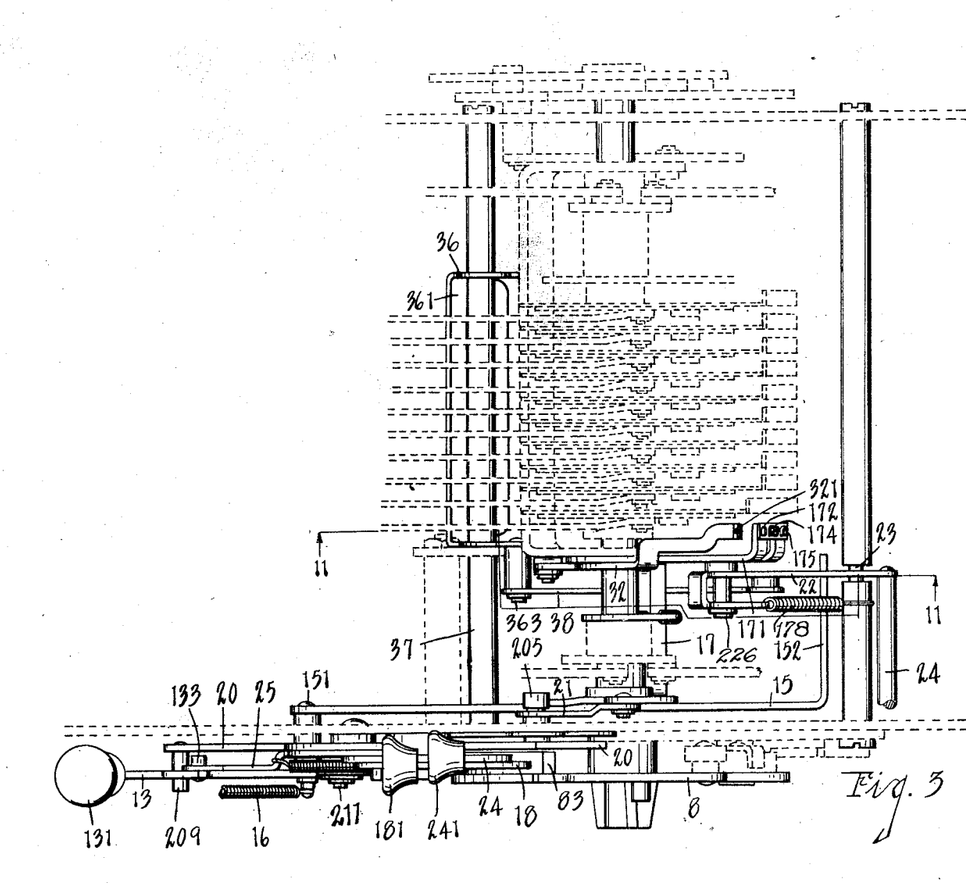
Fig. 3 is a right side elevation view of substantially the same parts shown in Fig. 2, the parts being in position for printing a non-add signal.

I will now describe my non-add signal in conjunction with the mechanism of the Corona adding machine to which I have shown its adaptation. By reference to Fig. 3, 13 is a non-add key stem projecting slightly above the keys 2 of the adding machine, as shown in Fig. 1. 131 is a finger button attached to said key stem 13. This key stem is adapted to project through a metal plate 14 and is provided with a notch 132 adapted to be latched under said plate 14 when said key stem 13 is fully depressed. 15 is a lever pivoted upon the main shaft 9 of the adding machine. To the forward end of this lever 15 at 151 is pivotally attached said key stem 13. 16 is a spring to hold said key stem 13 and lever 15 in normal position.

Figure 2:
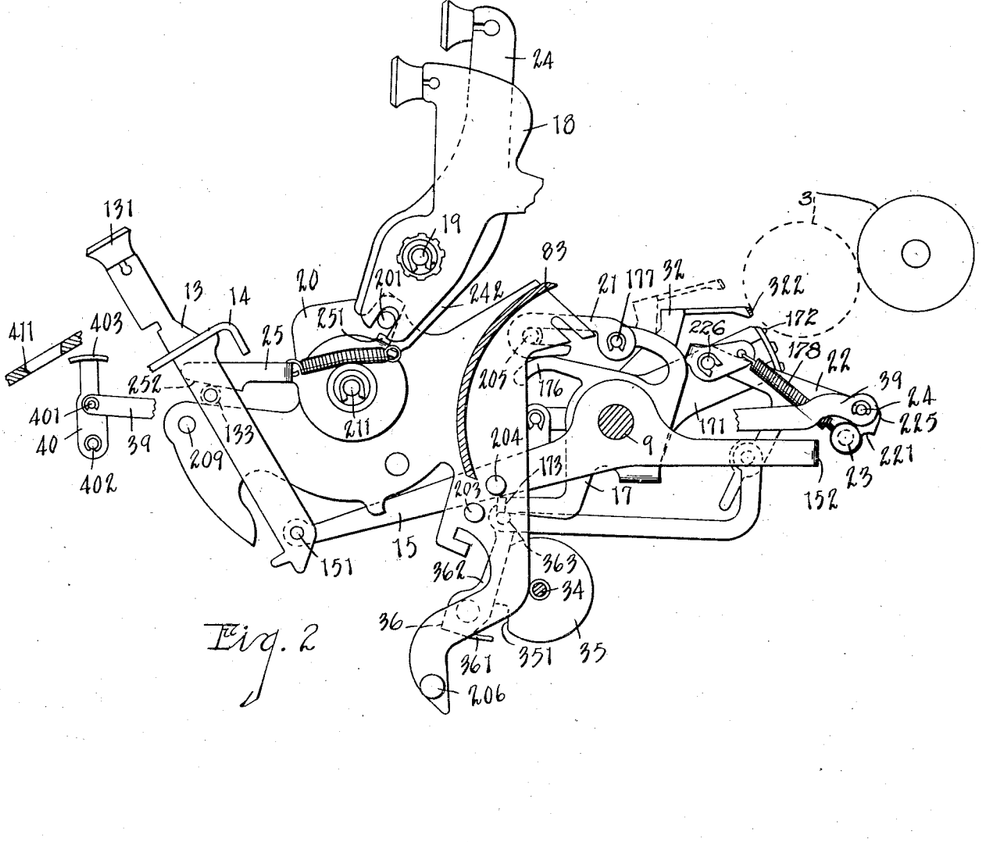
Fig. 2 is a right side fragmentary elevation view of certain controlling parts of the Corona adding machine, others shown in Fig. 1 having been eliminated or broken away to expose the parts of my invention.
Figures 5, 6:
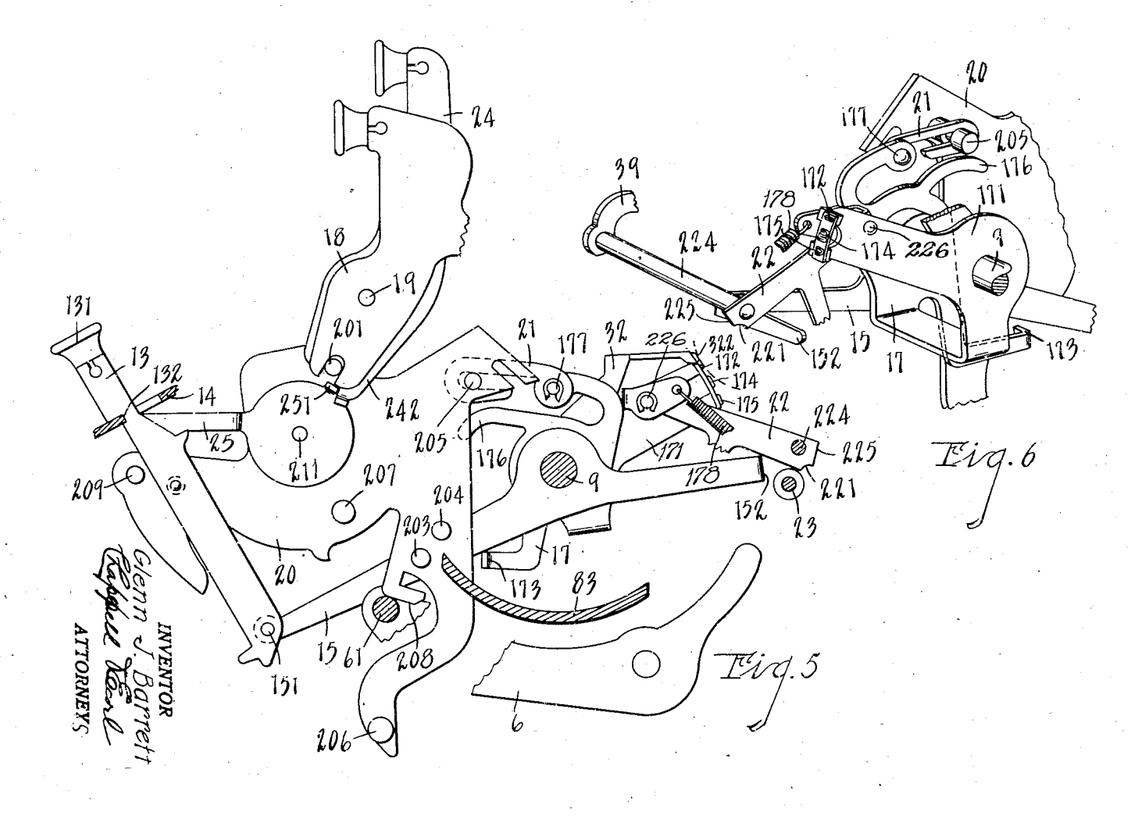
Fig. 5 is a view of substantially the same parts of the Corona adding machine with my invention applied, said parts being in the position of printing a total, the operating handle at the forward end of its stroke and the two types for printing the total signal in printing position.
Fig. 6 is a rear left hand fragmentary perspective view of the swinging yoke bearing the non-add, subtotal, and clear signals, together with certain cooperating connections and printing means.
Figure 10:
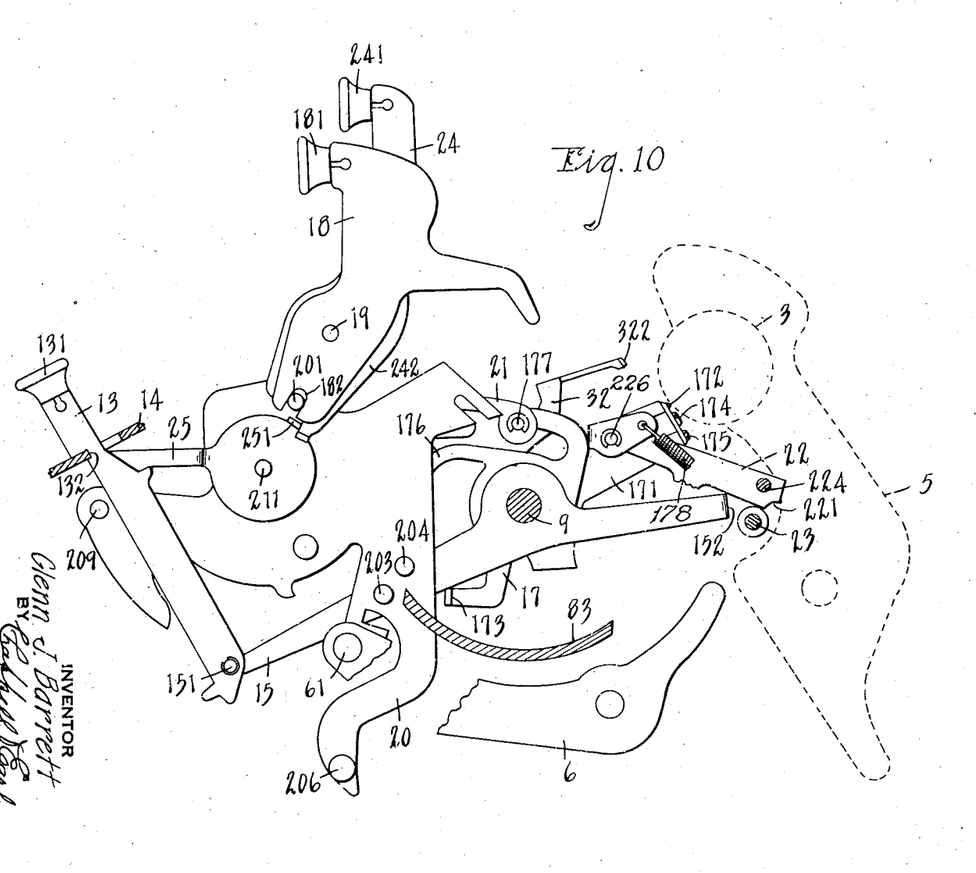
Fig. 10 is a fragmentary detail elevation view partly in section, of my invention applied to a Corona adding machine as shown in Fig. 1, the platen being in dotted lines, parts of said Corona machine being broken away to expose the parts of my invention, all of said parts being in the position immediately following the printing of a total signal, as shown in Fig. 5, during the early portion of the return of the operating handle, showing the clear signal positioned to print opposite the first item to be added in a new series.

17 is a U-shaped yoke shown in the perspective view Fig. 6, having at one end upon the arm 171 thereof the non-add signal 172. This is held down to normal position by spring 178, hereafter to be described. (See Fig. 3.) 173 is an ear formed at right angles from the yoke 17 and adapted to be contacted by the lever 15 upon the depression of the key 131. Fig. 10 shows the non-add key stem 13 depressed to latched position and the non-add signal type 172 positioned in printing position. Fig. 2 shows said type 172 in normal position out of printing position. It will be understood that in the Corona adding machine this key stem 13 is released from the plate 14 during the action of forcing the accumulators out of mesh, as will be described in connection with the final totaling operation, at which point the signal 172 drops back to normal position, as shown in Figs. 1 and 2.

I have chosen a dash to represent a non-added operation which, when printed opposite an item, means that said item was not added into the accumulators.

I will now describe my subtotal signal: An "S" character 174 is placed upon the same arm as my signal 172, slightly lower. In the Corona adding machine 18 represents the subtotal key or lever pivoted at 19 upon the side plate 1. 20 is a swinging member pivoted at 211 upon said side plate 1. This member is adapted to swing to a limited extent in both directions from the central position where it is held by spring 29. 201 is a pin located in the swinging member 20 and normally extending through a slot 182 in the lever 18. 181 is the finger button carried by said lever 18. A depression of said button 181 causes the upper portion of said member 20 to swing toward the front of the adding machine. This lever 18 is non-latchable in said depressed position until after the main operating mechanism shall have started. 203 is a pin located in said member 20, and 204 is another just like it located slightly above the former. The plate 83 on member 8 normally passes between these two pins 204 and 203 during the normal adding operation of the machine, but when the lever 18 is depressed the pin 203 is forced into position shown in Fig. 7, and when the handle starts it is held upon the inside of the curved plate 83 until the main operating mechanism approaches the forward end of its travel. On the member 20 is the stud 205 extending inwardly toward the center of the adding machine. 21 is a slotted link extending from this stud 205 to a stud 177 in the member 17. When the member 20 takes the position shown in Fig. 7, after the depression of the subtotal key 181 and the starting of the main operating mechanism, the stud 205 contacts with one end of the slot in the link 21 and because of the connections to the arm 17, said yoke composing said arm 17, and the type carrier arm 171, swings into position shown in Fig. 7 which places the subtotal character, which I prefer to be an "S" indicated as 174, in printing position shown in Fig. 7.

In the Corona adding machine when the main operating mechanism nears its forward limit, the pin 203 drops off the curved plate 83 and the member 20 then takes its normal position, slightly before the printing of the total. In order to retain said subtotal signal 174 in printing position after the return of the member 20 to normal position, I provide the latch 22 having a subtotal engaging notch 221, adapted to lock against the shaft 23. Latch 22 is supported pivotally on pivot 222 carried by member 17. Latch 22 is turned into U-shape, see Fig. 3. Spring 178 connects to the U extension of latch 22 at its upper end and to cross rod 23 at its lower end shown in plan in Figs. 3 and 15 and in elevation in Figs. 2, 4, 7, 10 and 11. By means of this latch 22 engaging the shaft 23 at the point 221 on said latch, even though the member 20 returns to normal position after the backward rotation of the accumulators to the zero position, the signal 174 will remain in printing position (see Fig. 7) to print the special character "S" to indicate a subtotal, in juxtaposition to the printed total. In the Corona as in other machines of its class, after the printing of a subtotal the accumulators are held in mesh and are rotated back again to their former accumulative positions.

I have provided means for unlatching said latch 22 from said shaft 23 and for allowing said signal 174 to return to normal position, during the next operation of the main operating mechanism following said subtotal operation, which mechanism will be described in detail in connection with the description of my clear signal, which mechanism operates to unlatch the latch 22 upon a forward movement of said main operating mechanism, when any of said accumulators are not at the zero position.

I will now describe my final total identifying character, which is positioned during the operation of the main operating mechanism and not directly by the depression of the final total key, as is the case with the subtotal signal.

24 is the final total lever also pivoted at 19. This lever 24 bears the final total button 241. Its lower portion contacts with the same pin 201 as does the lower portion of said lever 18. The depression of said lever 24 positions the member 20 just the same as in the depression of said lever 18, which prevents the normal operation of the roller 10 against the cam 81, owing to the contact of the stud 206 against the arm 11 at 111 which swings said arm 11 to the position shown in Fig. 7, as when obtaining a subtotal. But in obtaining a final total after which the accumulators must be left at the zero position, it is necessary to operate the non-add feature heretofore mentioned in conjunction with the positioning of parts to print the total.

To this end the lever 25 is provided pivoted at 21. 251 is an ear upon which an extension 242 from lever 24 contacts upon the depression of said lever 24. Upon depression of said lever 24 the lever 25 contacts with pin 133 extending inwardly from the key stem 13 and forces said key stem down to latching position shown in Fig. 5. With the final total lever 24 depressed, the total is printed and during the early return of the main operating mechanism a non-add operation takes place, due to the positioning the said non-add key stem by said depression of the lever 24, as illustrated in Fig. 9.

In the Corona adding machine the accumulators are forced out of mesh with the actuators during the early portion of the return of the main operating mechanism, under said non-add operation in the following manner. 26 is a non-add pawl pivoted at 27 upon the frame 1 of the adding machine. The rear end 261 of said pawl 26 is normally out of the path of travel of the pin 84 carried by the plate 8. Connecting said pawl 26 with the key stem 13 is the spring 28 forming a yielding connection between the two said parts.

Upon depression of said key stem 13 the rear end 261 of said pawl 26 is forced out into the path of travel of said pin 84, which freely passes same upon the forward movement of said main operating mechanism. However, said pawl 26 snaps back into said path of travel before said pin 84 starts upon its return, when said pin 84 engages said pawl 26 at 261 and forces same to position shown in Fig. 4. 207 is a pin carried by the swinging member 20 against which the pawl 26 contacts at 262. The movement of said pawl 26 to position shown in Fig. 4 causes the member 20 to swing in the reverse direction to that when taking a position to print a total, against the tension of the centralizing spring 29 shown in Fig. 1. 208 (Fig. 10) is a cam projection from the plate 20 adapted to contact with a stud 61 in the accumulator frame 6, when said member 20 swings toward the left to position shown in Fig. 10, and forces said accumulator frame 6 down until said accumulators are out of mesh with their cooperating actuators. Fig. 10 shows a portion of the accumulator pinions 30 and a portion of their cooperating actuators 31 broken away. When the above non-adding operation takes place after the printing of a total, it will be understood that the accumulators are left at zero position.

During the operation of taking a final total, while the member 20 is swinging to position shown in Fig. 10, the pin 209 in member 20 contacts with the edge of the key stem 13, the spring 16 returning said key stem to normal position.

The final total signal of my invention consists of two parts positioned for printing independently of the total key 24. It will be seen that the subtotal signal 174 would normally be positioned for printing by depression of the lever 24, inasmuch as said lever operates the same total printing parts as lever 18. But I have provided means for making the latch 22 inoperative during a depression of said lever 24. At the rear end of the non-add signal lever 15 I have provided an angular ear 152 which extends under said latch 22. As stated, the operation of said lever 24 also positions the non-add mechanism in the adding machine, causing the rear end 152 of said lever 15 to rise to position shown in Fig. 5 in which position the notch 221 in the latch 22 cannot become engaged against the shaft 23. The detail of this movement is described above. (See paragraph 1 of page 16.)

During the totaling operation while the pin 203 is riding along upon the inside of the curved plate 83, the "S" signal 174 is held in printing position, but as the main operating mechanism nears the end of its forward movement, said pin 203 slips off of the plate 83 and the subtotal signal 174 drops down by reason of the connections 21, 205, etc. to the member 20. However, at this point just before the platen impinges against the type, the non-add signal being positioned by latching of the key stem 13 upon the plate 14 at the depression of said final total key 24 as described, the signal arm 171 drops back to the normal position of the non-add signal, the dash 172, for printing. The slot in the link 21 is for the purpose of allowing said subtotal signal 174 to remain in printing position when desired, as when taking a subtotal operation after the member 20 returns to normal position, and admit of an independent movement of the member 171 in positioning the non-add signal prior to the printing of a final total.

In other words, my invention provides for the use of the non-add portion of my signals when taking a final total operation. However, in order to have some distinguishing means to designate the difference between a final total operation and a plain non-add operation wherein an item is printed and not added into the accumulator, I have provided an additional character, preferably a star located upon a suitable swinging arm 32 (Figs. 11 and 13) pivoted upon the main shaft 9 inside of the yoke formed by the yoke 17 and the arm 171. The arm 32 is offset and extends over into line with the subtotal signal 174 and the non-add signal 172, as may be seen in Fig. 4. This arm 32 swings independently of the arm 171. Attached to said arm 32 at 321 is the slotted link 33 which extends to the accumulator frame 6, being attached pivotally to the shaft 34 (see Fig. 11) for the accumulators 30.

Under this construction when the accumulators go out of mesh as when adding, the signal arm 32 carrying the star signal 322 rises to position shown in Fig. 10 entirely out of printing position. Whenever the accumulators are left in mesh as when taking a total, this star 322 is allowed to drop until it is stopped by contact against the arm 171. In taking a subtotal, as the signal 174 is in position, the star 322 is held by the position of the arm 171 out of printing position, and when the arm 171 is dropped back to the printing position for the non-add signal 172 and the accumulators are in mesh, the star will take its position against said non-add signal 172 and print just above the same. Thus the final total signal is * clearly distinguishable from the non-add signal alone.

I will now describe my clear signal for printing a designating character in proximity to the first item to be added after a final totaling operation. Upon the type arm 171 is mounted a "C" type face which I prefer to use as an identifying character for the purpose. This "C" is designated as 175 in the several views illustrated. This "C" type is positioned in printing position and latched by means of the pawl 22 engaging its end 225 against the shaft 23, during the non-add operation in conjunction with a final totaling operation which follows immediately after the printing of the total, as hereinbefore described.

Figure 4:
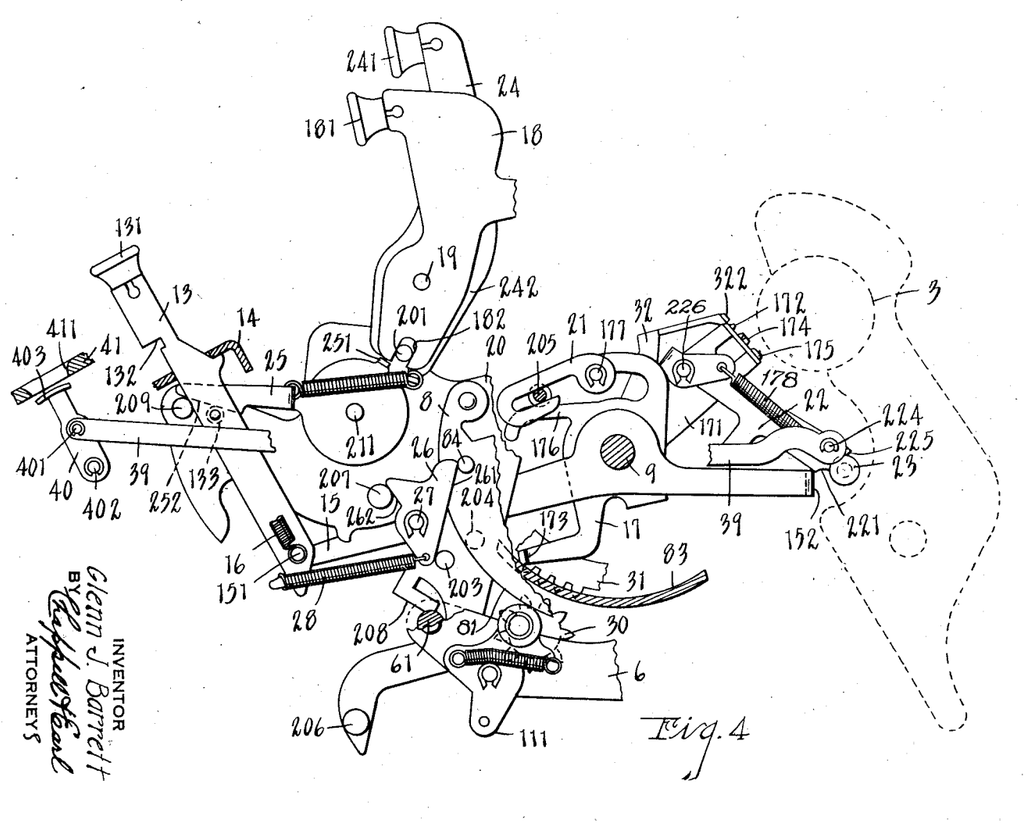
Fig. 4 is a detail fragmentary plan view of my invention as applied to a Corona adding machine, showing certain cooperating parts of the machine in relation to the parts of my invention with the exception of the visible annunciator thereof, the case being omitted and parts indicated by dotted lines.

In connection with the description of the positioning of the final total compound signal, I explained how the double final total signal took its position governed by the positioning of the non-add signal and the position of the accumulator frame. Immediately after the printing of this compound final total signal and during the operation of the non-add feature of the adding machine, in order to leave the accumulators at zero position, the parts of the adding machine assume the positions shown in Fig. 4. The stud 205 carried by the swinging member 20 contacts against the arm 176 (Fig. 4) which causes the type carrying arm 171 to take the position shown in Fig. 4 in which position the "C" type 175 is placed in printing position. When the arm 171 swings to position shown in Fig. 4, the pawl 22 latches by engaging its end 225 against the shaft 23. It will be understood that the type "C" 175 takes the position shown in Fig. 4 at each regular non-add operation, in connection with recording an item without accumulating the same upon the accumulators, as hereinbefore explained. However in such case the pawl 22 is not allowed to latch against the shaft 23, as after a final total, because the movement of the accumulator frame out of mesh in a non-add operation holds said pawl out of contact position with the shaft 23 by reason of the connection 38 from pawl 22 to a tripping member 36 (Fig. 13), as explained hereinafter in connection with the description of the means for tripping off said clear signal. The type arm then drops back to the printing position of the regular non-add signal, or position shown in Fig. 5. During the final totaling operation, however, the key stem 13 is released by the pin 209 just before the "C" type 175 is fully positioned so that the ear 152 is dropped back to normal position, allowing the pawl 22 to latch on its end at 225 behind the shaft 23, as shown in Fig. 4.

Under the provisions of my invention, this clear signal 175 remains in printing position during successive operations of the main operating mechanism of the adding machine just so long as no number is accumulated in the accumulators. In other words, so long as the accumulators remain at zero position.

My invention provides for means of tripping off the pawl 22 during the early portion of the operation of the main operating mechanism after any one of said accumulators shall have passed from the zero position. In the Corona adding machine two ciphers print at each idle handle stroke. My "C" type will print opposite said ciphers during such idle handle strokes so long as the accumulators remain at zero position, as well as opposite any printed number while the accumulators remain at zero.

I will now describe by means for tripping off said pawl 22 and thus restoring said clear signal 175 to normal position during the early portion of the movement of said operating mechanism, when any one of said accumulators is not at zero position. Fig. 11 shows by clear signal 175 latched in printing position after a final totaling operation. 35 are disks rigidly attached to each accumulator at one side of its driving pinion 30. These disks have a notch 351 in their respective peripheries, as shown. 36 is a tripping member in the form of a U, pivoted at 37, as shown in Figs. 11, 12 and 13. A tripping portion 361 extends across the entire accumulator section, presenting this tripping edge 361 to the peripheries of all the disks 35. The notches 351 are all arranged so that they will be positioned opposite said tripping edge 361 when their respective accumulators are at the zero position. When any of said accumulators is not at zero position and the accumulator frame swings out of mesh as it does during the early portion of the movement of said operating mechanism, the disk of any such accumulator not being at the zero position as shown in Fig. 12, its periphery will contact with said edge 361 and cause the tripping member 36 to swing upon its pivot 37. If all of the accumulators are at zero position, as shown in Figs. 11 and 13, then such movement of the accumulator frame will not cause any movement of the tripping member 36. I have provided a suitable connection in the form of a link 38 from the arm 362 of the tripping member 36 to the latching pawl 22, 363 being the pivotal connection to 36 and 222 the pivotal connection to said pawl 22. 223 is a stop arm portion of the pawl 22 normally resting against the lower portion of U frame 17 to maintain the tripping member etc., in normal position. When the disks 35 are all in position shown in Fig. 13 there will be no movement of said tripping member 36, but when any disk 35 is in position shown in Fig. 12, when the accumulators go out of mesh, the tripping member will be forced to take the position shown in dotted lines in Fig. 13 in which case the pawl 22 will be elevated to position shown in dotted lines in said Fig. 12, in which case the type arm 171 returns to normal position also shown by said dotted lines in Fig. 13.

This tripping means operates not only to reset the clear signal after an addition but serves to release the latching of pawl 22 upon shaft 23 during an operation after positioning a subtotal signal 174, so that a subtotal signal would not follow opposite an item added after a subtotal operation. Generally speaking this tripping means 36 and connections serve to unlatch pawl 22 from shaft 23, or prevent a latching when accumulators are not all at zero position in order to make certain operations of the signal device effective as herein before explained.

Figures 14, 15:
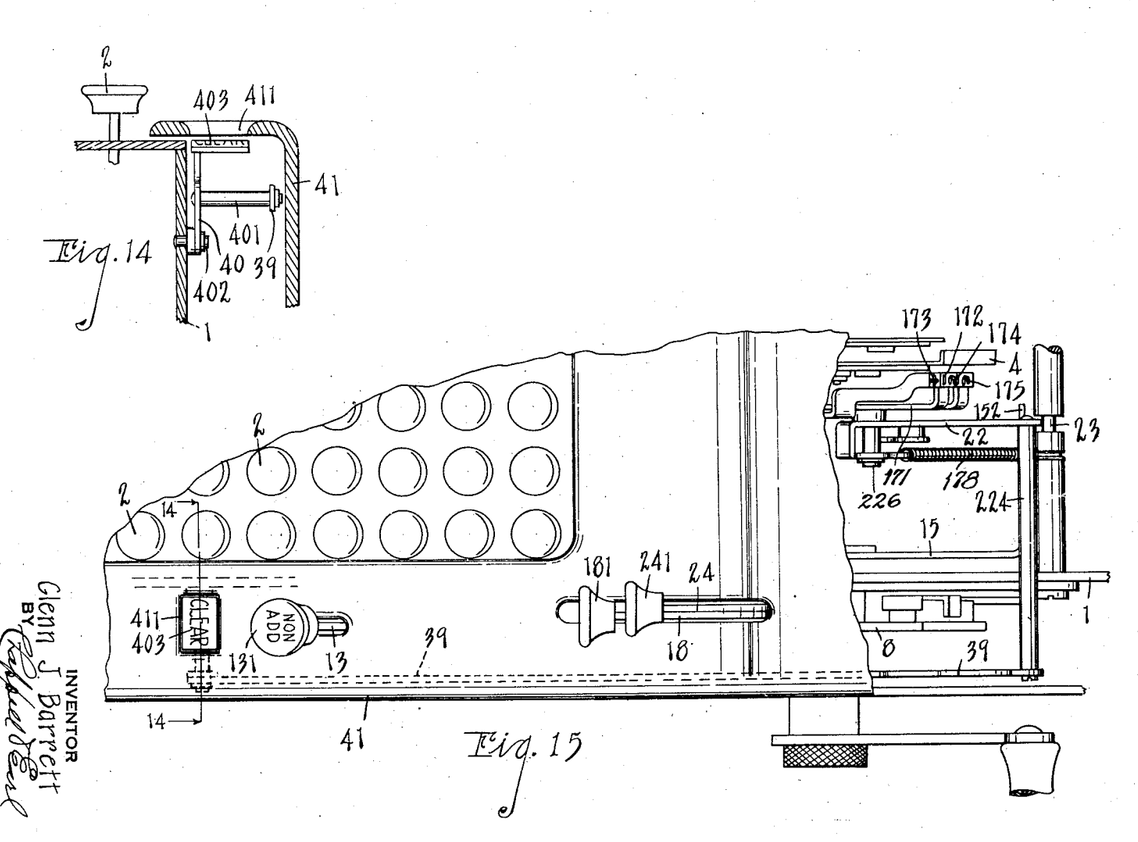
Fig. 14 is a front detail sectional view taken on line 14—14 of Fig. 15, showing my visible annunciator operating in conjunction with the other parts of my invention. This view also shows a sectional view of a small portion of said Corona machine case, frame, and keyboard top plate.
Fig. 15 is a fragmentary plan view of my invention as applied to a Corona adding machine, showing a small portion of the right side of the latter, a portion of which is broken away to expose certain portions of my invention. This view also shows the relative position of my visible annunciator as applied to said Corona adding machine.

I will now describe my visible signal operating in conjunction with the positioning of my clear signal for printing, for the purpose of indicating to an operator prior to the operation of the main operating mechanism of the adding machine, that a final total operation has previously been taken and that the accumulators are clear. 224 is a stud riveted into the pawl 22 shown in Figs. 4 and 15. 39 is a link pivoted to the end of said stud 224 by a shouldered screw, extending forward and connecting to a swinging indicator arm 40 at 401, said indicator arm being pivoted at 402 upon the side plate 1 of the adding machine, see Figs. 14 and 15. Normally when the signal arm 171 is out of printing position the visible signal arm is back or in position shown in Figs. 1 and 2, where it cannot be seen through an opening 411 in the case 41 of the adding machine. 403 is a formed over ear on indicator arm 40 upon which may be placed the wording "Clear".

After a final totaling operation, when the pawl 22 is positioned as shown in Figs. 11 and 13, this indicating signal 403 will be in visible position as shown in Fig. 15. When the pawl 22 is tripped for any of the reasons hereinbefore stated, this clear sign 403 will move out of visible position coincidental to the movement of said pawl 22. In order to definitely determine whether the accumulators are clear, an operator gives the operating means a slight jerk forwardly, but does not draw said means far enough forward to make a complete movement of said operating mechanism necessary. This slight jerk causes a contact between the roller 10 and the cam 81 which momentarily forces the accumulators out of mesh and then allows them to drop back again to former position. This outward movement of the accumulators is sufficient to trip off the visible signal if any accumulator is not at zero position. If the visible signal still remains, then the operator may know that the accumulators are all at zero position without waiting to perform a full movement of the operating means to record the signal upon the tape of the adding machine. It will be seen that said visible signal will remain in visible position so long as said "Clear" signal type 175 remains in printing position.

The above described invention may be applied to any standard adding machine wherein will be found mechanical equivalents for the devices described of the Corona adding machine.

Having thus described my invention, what I claim as new and desire to secure by Letters Patent, is:

1. In an adding machine of the class described having the elements as specified, the combination of an identifying non-add type character mounted upon a suitable movable carrier, positionable by the movement of the settable non-add means of the adding machine, and a second identifying type character mounted upon an independent carrier, said second identifying character being in lateral alignment with said non-add character, a yielding means for maintaining said second identifying character in proximity to said non-add character during a totaling operation of said adding machine, and means for maintaining said second identifying character away from said non-add identifying character and out of printing position when the accumulators of the adding machine are out of operative relation with their respective actuators, consisting of suitable connections from said independent carrier to the accumulator frame of said adding machine.

2. In an adding machine of the class described having the elements as specified, the combination of means for printing a final total signal in juxtaposition to the final total, consisting of two separate identifying types, independently mounted in lateral alignment, upon suitable movable carriers, means for positioning one of said identifying types in printing position automatically during the operation of the main operating mechanism of said adding machine and controlled by the setting of the settable non-add means in same, means for positioning the other of said identifying types for printing in proximity to first said identifying type consisting of a yielding spring, and means for moving said second identifying type out of printing position when the accumulators of said adding machine go out of operative relation to their respective actuators, consisting of suitable connections between said carrier for said second identifying type and the oscillating frame for said accumulators in said adding machine.

3. In an adding machine of the class described having the elements as specified, the combination of a final total signal printing means operable to print in juxtaposition to the final total, consisting of two separate identifying types independently mounted in lateral alignment upon suitable carriers, means for positioning one of said identifying types during the operation of the main operating mechanism of the adding machine, and controlled by the setting of the settable non-add means in same, and a yielding means for positioning the second said identifying type in printing position in proximity to said first identifying type.

4. In an adding machine of the class described having the elements as specified, the combination of an identifying non-add type character mounted upon a suitable movable carrier, positionable in printing position by the movement of the settable non-add means of the adding machine, a second identifying type character mounted upon an independent carrier in lateral alignment with said non-add type character, means for maintaining said second identifying type character in proximity to said non-add type character during a totaling operation of the adding machine, and means for maintaining said second identifying type character away from said non-add type character and out of printing position when the accumulators of the said adding machine are out of operative relation with their respective actuators.

5. In an adding machine of the class described having the elements as specified, the combination of a final total signal printing means composed of two separate identifying types, positionable for printing in juxtaposition to the final total, means for positioning one of said identifying types controlled by the operation of the settable non-add means in said adding machine, and means for controlling the position of said second identifying type actuated by the movement of the accumulator frame of said adding machine when moving said accumulators out of or into active operative positions with reference to the actuators therefor.

6. In an adding machine of the class described having the elements as specified, the combination of a positionable non-add identifying signal printing means manually positionable for printing in juxtaposition to a non-added item, a final total identifying signal printable in juxtaposition to a final total consisting of said non-add identifying signal positioned during the operation of said adding machine when taking a final total, a second identifying type character mounted in lateral alignment with said non-add signal upon a suitable movable carrier independent thereof, and means for positioning said second identifying type in printing position near said non-add signal, when the accumulators of said adding machine are in active relation to their respective actuators.

7. In an adding machine of the class described having the elements as specified, a final total identifying signal printing means, positionable for printing in juxtaposition to the final total of said adding machine, said identifying signal printing means being composed of two independently movable type characters, one of which is positioned and controlled by the operation of the non-add means during the operation of the machine in obtaining a final total, and the other of said movable type characters being positioned in printing position when taking a final total adjacent to said first movable type character, by the positioning of said first movable type character.

8. In an adding machine of the class described having the elements as specified embracing the usual accumulators and actuating means, the combination of identifying final total type positionable for printing in juxtaposition to the final total, and means controlled by the operation of the non-add means of said adding machine for positioning said identifying final total type when said accumulators of said adding machine are in said active position with reference to said actuators.

9. In an adding machine of the class described having the elements as specified embracing the usual accumulators and actuating means, the combination of positionable final total identifying type, means controlled by the operation of the non-add mechanism of said adding machine during the process of taking a final total, for positioning said identifying final total signal type for printing, and means controlled by the movement of the accumulator frame of said adding machine for returning a portion of said total signal type to normal position.

10. In an adding machine of the class described having the elements as specified, the combination of a subtotal identifying type character normally out of printing position mounted upon a suitable oscillating carrier, a connection from the subtotal key of said adding machine to said carrier, a latch for maintaining said subtotal identifying type character in printing position independently of said subtotal key after the depression of said subtotal key lever and during the printing of said subtotal identifying character, means for releasing said latch and for returning said subtotal identifying type character to normal position during the next operation of the main operating mechanism of said adding machine following said subtotal printing consisting of a tripping member pivotally located in proximity to the accumulators of said adding machine, a disk carried by each of said accumulators adapted to contact against said tripping member when said accumulators go out of active position with relation to their actuators in said adding machine when said accumulators are at any other than a zero position, and connections between said tripping member and said latch for said subtotal identifying type character.

11. In an adding machine of the class described having the elements specified, the combination of a subtotal identifying type signal normally out of printing position, mounted upon a suitable oscillating carrier, a connection from the subtotal key of said adding machine to said identifying type signal carrier, a latch for maintaining said subtotal type identifying character in printing position during the printing of said subtotal character, independently of said subtotal key, means for releasing said latch during an operation of the main operating mechanism of said adding machine following said printing of said subtotal consisting of a tripping means actuated by the movement of the accumulator frame of said adding machine when any of the accumulators therein are not at zero position, and connections from said tripping means to said latch.

12. In an adding machine of the class described, having the elements specified, the combination of a subtotal identifying type signal normally out of printing position mounted upon an oscillating carrier, a connection from the subtotal key of said adding machine to said carrier, a latch for maintaining said identifying type signal in printing position independently of said subtotal key, and means for releasing said latch during the movement of the accumulator frame of said adding machine when any of the accumulators carried in said frame are not at zero position.

13. In an adding machine of the class described having the elements specified, the combination of a non-add signal printing type and a subtotal signal printing type differentially mounted upon a common oscillating carrier, connections from both the subtotal key and the final total key of said adding machine to said oscillating carrier whereby said subtotal signal printing type is positioned in printing position by the depression of either of said total keys, a latch for retaining said subtotal signal printing type in printing position independently of said subtotal key, means for rendering said latch ineffective as to retaining said carrier after said subtotal identifying character is positioned by said final total key, means for positioning said non-add signal printing type after the depression of said final total key and prior to the printing of the total, and means for moving said non-add signal printing type out of printing position following a total printing operation on said adding machine.

14. In an adding machine of the class described having the elements specified, the combination of final total identifying character type positionable for printing during a final total operation of said adding machine, and mounted upon suitable oscillating carriers, a clear indicating character type also mounted upon one of said oscillating carriers, means for positioning said type to indicate clear in printing position during said final total operation after the printing of the total, consisting of suitable connections between one of said oscillating carriers and the settable non-add element of said adding machine for maintaining the accumulators of said adding machine out of active relation to their respective actuators, means for latching said clear indicating type in printing position, means for maintaining said clear indicating type in printing position during successive adding operations of the main operating mechanism of said adding machine after the printing of said total and while said accumulators remain at zero position, means for unlatching said clear indicating type during a subsequent operation of said main operating mechanism after said printing of said total when any of said accumulators is not at said zero position, consisting of a tripping member pivotally mounted in proximity to said accumulators, a contact portion carried by said tripping member having a universal relation to all of said accumulators, a disk having a notch or opening in its periphery rigidly attached to each of said accumulators and so positioned that said notch or opening is opposite said contact portion when its coacting accumulator is at zero position, the peripheries of said disks aside from said notches or openings being adapted to contact against said contact portion when said accumulators are moved out of active relation to their actuators, connections between said tripping member and said latching means for maintaining said clear indicating type in printing position, and means for returning said clear indicating type to normal position when unlatched.

15. In an adding machine of the class described having the elements as specified, including accumulators, the combination of final total identifying character type positionable for printing during a final total operation of said adding machine, and mounted upon suitable oscillating carriers, a clear indicating character type also mounted upon one of said oscillating carriers, means for positioning said clear indicating type in printing position during said final total operation after the printing of the final total, consisting of suitable connections between one of said oscillating carriers and the settable non-add element of said adding machine, a latch for latching said clear indicating type in printing position, means for maintaining said clear indicating type in printing position during successive adding operations of the main operating mechanism of said adding machine after the printing of said total and for releasing said clear indicating type from printing position during an operation of said main operating mechanism after said final total operation when any of said accumulators is not at zero position, consisting of a tripping member pivotally located in proximity to said accumulators, a contact edge on said tripping member extending in universal relation to said accumulators, a disk having a notch or opening in its periphery rigidly attached to each of said accumulators, and so positioned that said notch or opening is opposite said contact edge when its coacting accumulator is at zero position, the peripheries of said disks being adapted to contact with said contact portion of said tripping member, and connections from said tripping member to said latch.

16. In an adding machine of the class described having the elements as specified, including accumulators, the combination of a clear indicating type mounted upon an oscillating carrier, means for positioning said clear indicating type in printing position during the operation of the main operating mechanism of said adding machine after the printing of a final total consisting of suitable connections from said oscillating carrier and the settable non-add means of said adding machine, a latching means for retaining said clear indicating type in printing position during successive adding operation of said adding machine following the operation of obtaining a final total, means for releasing said clear indicating means from printing position during an adding operation of said main operating mechanism following a said final total operation consisting of a pivotally mounted tripping member having a contact portion extending in universal relation to said accumulators, disks carried by each of said accumulators the peripheries of which are adapted to contact with said contact portion of said tripping member when its coacting accumulator is not at zero position, and suitable connections between said tripping member and said latching means for retaining said clear indicating type in printing position.

17. In an adding machine of the class described having the elements specified, the combination of a clear indicating type mounted upon a movable carrier, means for positioning said clear indicating type in printing position during the operation of the main operating mechanism of said adding machine after the printing of a final total consisting of suitable connections between said movable member bearing said clear indicating type and the settable non-add means in said adding machine, means for latching said clear indicating type in printing position, means for unlatching the same during an adding movement of said main operating mechanism following the printing of a final total consisting of a tripping means actuated by a movement of the accumulators of said adding machine out of active relation with their actuators when any of said accumulators is not at zero position, and connections between said tripping means and said means for latching said clear indicating type in printing position.

18. In an adding machine of the class described having the elements as specified, including accumulators, the combination of a clear indicating type mounted upon a movable carrier, means for positioning said clear indicating type in printing position during an operation of the main operating mechanism of said adding machine in obtaining a final total consisting of suitable connections to the settable non-add means in said adding machine, means for latching said clear indicating type in printing position, and means for unlatching same during an adding operation of said main operating mechanism following said final total operation actuated by the movement of said accumulators out of active relation to their actuators when any of the same are not at zero position.

19. In an adding machine of the class described having the elements as specified, the combination of a clear indicating type upon a suitable movable mounting, means for positioning same in printing position during a final total operation of said adding machine and after the printing of the final total, means for retaining said clear indicating signal in printing position during successive operations of the main operating mechanism of said adding machine when the accumulators of said adding machine are at zero position, and means for releasing said clear indicating type from printing position during an adding movement of said main operating mechanism actuated by the movement of said accumulators when any of said accumulators are not at zero position.

20. In an adding machine of the class described having the elements as specified, the combination of an indicating clear type positionably mounted upon a suitable carrier normally out of printing position, means for positioning said clear indicating type in printing position during an operation of the final total mechanism of said adding machine, means for retaining same in printing position, and means governed by the positions of any of the accumulators of said adding machine turned away from zero position for returning said clear indicating type to normal position actuated by the movement of said accumulators during an adding operation of said adding machine.

21. In an adding machine of the class described having the elements as specified, the combination of a non-add designating type and a clear indicating type mounted differentially upon a common oscillating carrier, means actuated by the main operating mechanism of said adding machine for positioning said clear designating type in printing position during a final total operation and after the printing of the final total, means for retaining said clear designating character in printing position during successive operations of said main operating mechanism while the accumulators of said adding machine remain at zero position, means connected to the settable non-add mechanism of said adding machine for releasing said clear designating type and for moving same from printing position and for positioning said non-add designating type in printing position, and means for returning said clear designating type to printing position during said operation of said main operating mechanism after the positioning and printing of said non-add designating type while said accumulators remain at zero position.

22. In an adding machine of the class described having the elements as specified, the combination of a non-add designating type mounted upon a suitable movable carrier, a clear designating type also mounted upon a suitable movable carrier, means actuated by the main operating mechanism of said adding machine for positioning said clear designating type in printing position during a final total operation and after the printing of the final total, means for retaining said clear designating type in printing position during successive adding operations of said main operating mechanism while the accumulators of said adding machine are at zero position, means connected to the settable non-add mechanism of said adding machine for releasing said clear designating type and for moving same from printing position and for positioning said non-add designating type in printing position during a non-add operation of said adding machine, and means for returning said clear designating type to printing position during said non-add operation after the printing of the non-added item.

23. In an adding machine of the class described having the elements as specified, the combination of a non-add designating type mounted upon a suitable movable carrier, means actuated by the main operating mechanism of said adding machine for positioning said clear designating type in printing position during a final total operation and after the printing of the final total, means for latching said clear designating type in printing position, means connected to the settable non-add mechanism of said adding machine for releasing said clear designating type and for moving same from printing position and for positioning said non-add designating type in printing position during a non-add operation of said adding machine, and means for returning said clear designating type to printing position during said non-add operation and after printing the non-added item.

24. In an adding machine of the class described having the elements as specified, the combination of a positionable clear designating type, means for positioning same in printing position during the operation of the non-add mechanism of said adding machine, means for maintaining said clear designating type in printing position when the accumulators of said adding machine are in active relation to their actuators, and means for returning said clear designating type out of printing position during said non-add operation when said accumulators are out of active relation to their actuators and when any of said accumulators is not at zero position.

25. In an adding machine of the class described, having the elements as specified, the combination of a positionable clear sign normally out of visible position, means for positioning said clear sign in visible position during the operation of a final total of said adding machne, means for maintaining said clear sign in said visible position during successive operations of said adding machine when its accumulators are at zero position, and means actuated by the movement of said accumulators for returning said visible clear signal to normal invisible position during an adding operation of the main operating mechanism of said adding machine when any of its said accumulators is not at zero position.

26. In an adding machine of the class described having the elements as specified including accumulators, the combination of a clear signal normally held in an invisible position, means for positioning same in a visible position during a final total operation of said adding machine, and means governed by the accumulative position of any of the said accumulators and actuated by said accumulators when standing in any but zero position for returnng said clear signal to an invisible position during an adding operation of said adding machine.

27. In an adding machine of the class described having the elements as specified, including accumulators, the combination of a series of positionable identifying type characters arranged in lateral alignment in proximity to the numeral types of said adding machine and normally out of printing position consisting of a non-add type character, means for positioning the same actuated by the settable non-add mechanism of said adding machine, a type character to denote a subtotal, means for positioning the same in printing position actuated by the depression of the subtotal key on said adding machine, a type character which together with said non-add type character denotes a final total, and means for positioning same in printing position governed by the main operating mechanism of said adding machine during a final total operation thereon, a type character to denote that the accumulators are clear, means for positioning the same in printing position during said final total operation and after the printing of the final total, means for maintaining said clear type character in printing position during successive operations of said main operating mechanism while the accumulators remain at zero position, and means for returning said clear type character to normal position during an adding operation of said main operating mechanism actuated by the movement of said accumulators when any of said accumulators are not at zero position.

28. In an adding machine of the class described having the elements as specified, including accumulators, the combination of a series of positionable identifying type characters arranged in lateral alignment in proximity to the numeral types of said adding machine and normally out of printing position consisting of a non-add type character, means for positioning same in printing position actuated by the settable non-add mechanism of said adding machine, a type character to denote a subtotal, means for positioning the same in printing position actuated by said subtotal key on said adding machine, an identifying type character employed in connection with said non-add character to denote a final total, means for positioning the same in printing position governed by the main operating mechanism of said adding machine during a final total operation thereof, a type character to denote that the accumulators are clear, means for positioning the same during a final total operation of said main operating mechanism after the printing of the final total, and means for returning said clear type character to normal position during an adding operation of said main operating mechanism actuated by the movement of said accumulators when any one of the said accumulators is not at zero position.

29. In an adding machine of the class described and having the elements specified, the combination of a positionable visible signal normally in a concealed position, means actuated by the main operating mechanism for moving said visible signal into a position of visibility during a final total operation of the main operating mechanism of said adding machine after the printing of the final total, means for retaining said visible signal in said position of visibility during successive operations of said main operating mechanism while the accumulators of said adding machine remain at zero position, and means actuated by the movement of said accumulators for returning said visible signal to normal position during an adding operation of said main operating mechanism when any of said accumulators is not at said zero position.

GLENN J. BARRETT.